April 21, 1936.　　　　F. C. WAPPLER　　　　2,038,393
ELECTRODIC ENDOSCOPIC INSTRUMENT
Filed Feb. 27, 1933　　　3 Sheets-Sheet 1
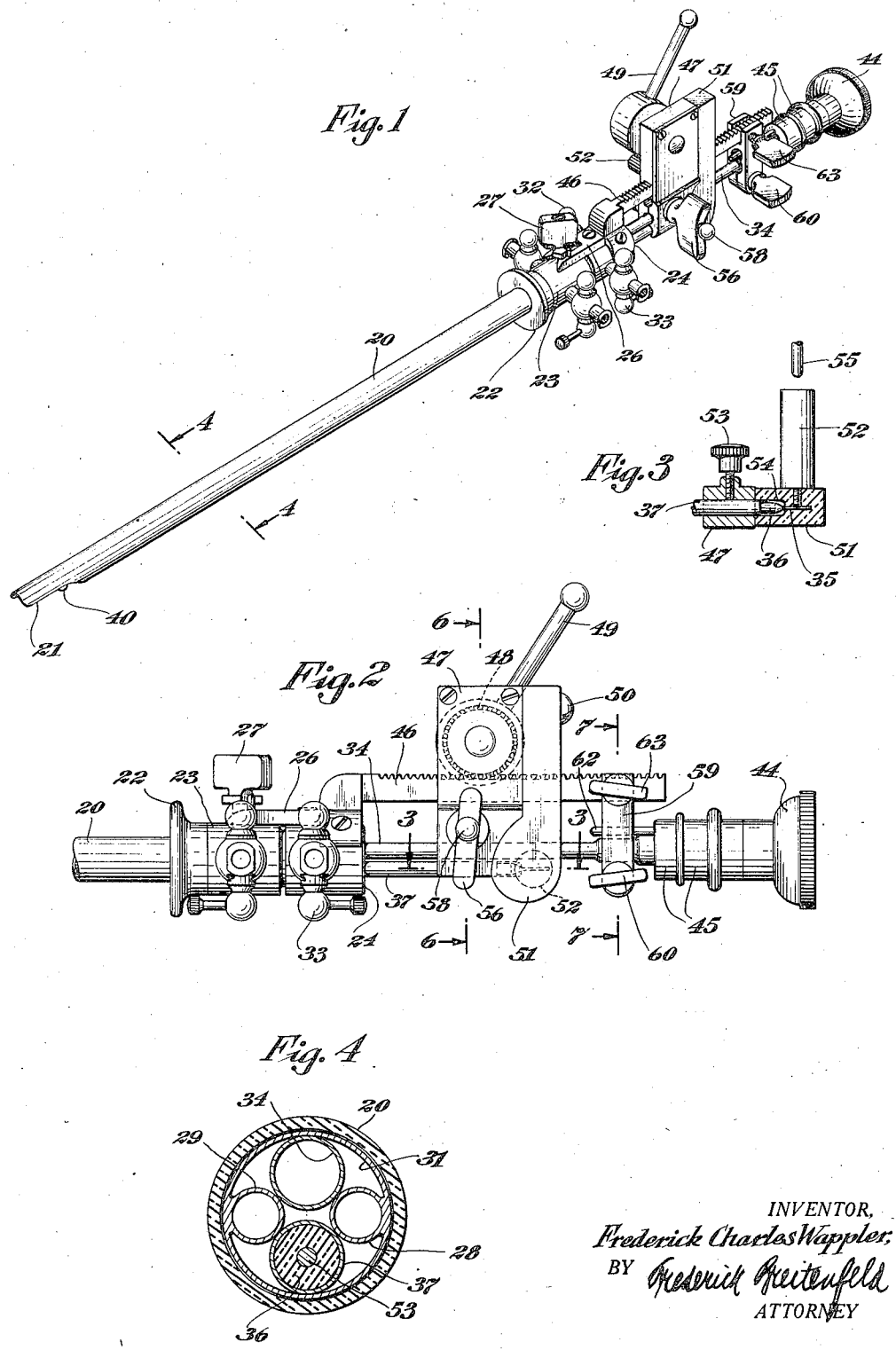
INVENTOR,
Frederick Charles Wappler,
BY Frederick Breitenfeld
ATTORNEY April 21, 1936.   F. C. WAPPLER   2,038,393
ELECTRODIC ENDOSCOPIC INSTRUMENT
Filed Feb. 27, 1933   3 Sheets-Sheet 2
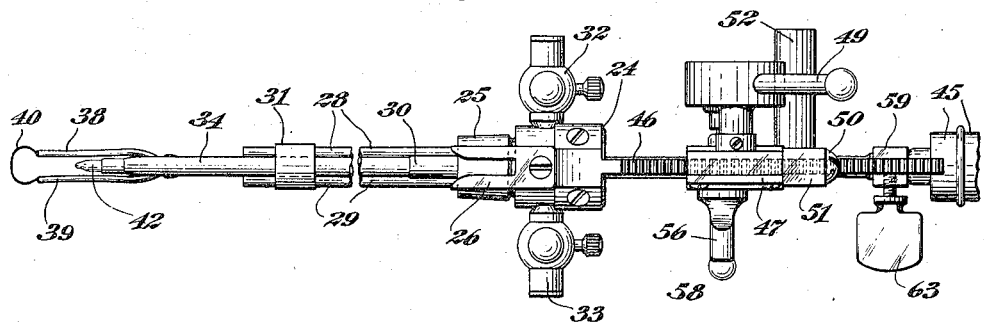
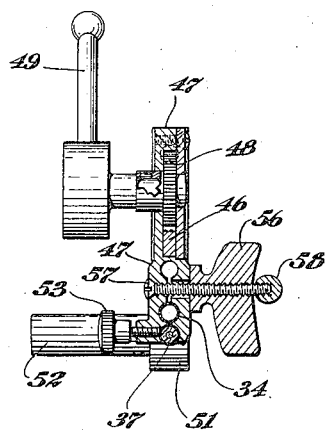
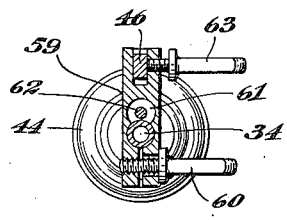
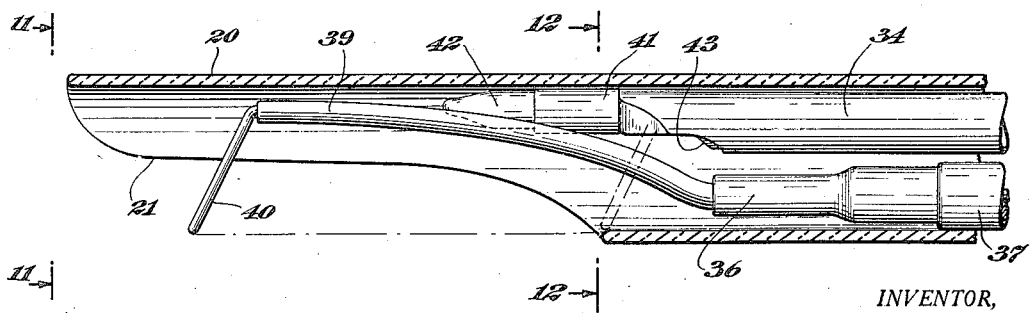
INVENTOR,
Frederick Charles Wappler,
BY Frederick Breitenfeld
ATTORNEY April 21, 1936. F. C. WAPPLER 2,038,393
ELECTRODIC ENDOSCOPIC INSTRUMENT
Filed Feb. 27, 1933 3 Sheets-Sheet 3

INVENTOR,
Frederick Charles Wappler,
BY Frederick Breitenfeld
ATTORNEY

Patented Apr. 21, 1936

2,038,393

UNITED STATES PATENT OFFICE 2,038,393

ELECTRODIC ENDOSCOPIC INSTRUMENT

Frederick Charles Wappler, New York, N. Y.

Application February 27, 1933, Serial No. 658,810

8 Claims. (Cl. 128—7)

My present invention relates generally to surgical instruments, and has particular reference to an improved type of electrodic instrument.

The type of device to which my invention relates consists generally of an endoscopic tube, a movable electrode rod in the tube, and a telescope commanding a view of the operative forward end of the rod. It is a general object of my invention to provide a construction of improved capabilities, from the standpoint of maintaining efficient visibility of the operative electrode at all times.

It is a more particular object to provide an arrangement whereby the operator may selectively adjust certain portions for the purpose of accomplishing two different types of visibility. More especially, the instrument permits the telescope to be locked, at will, to either the endoscopic tube or to the electrode rod. Where the telescope is locked to the tube, the conventional type of effect is accomplished; and by looking through the telescope the operative electrode is visible throughout its entire scope of travel. On the other hand, where the telescope is locked to the electrode rod, it moves with the electrode rod, and the operative electrode is maintained in a constant predetermined optical relationship to the objective of the telescope.

I achieve the foregoing objects, and such other objects as may hereinafter appear or be pointed out, in the manner illustratively exemplified in the accompanying drawings, wherein—

Figure 1 is a perspective view of an instrument embodying the features of my present invention;

Figure 2 is an enlarged elevational view of the rear end of the instrument of Figure 1;

Figure 3 is a fragmentary cross-sectional view taken substantially along the line 3—3 of Figure 2;

Figure 4 is an enlarged cross-sectional view taken substantially along the line 4—4 of Figure 1;

Figure 5 is a plan view of the operative portions of the device;

Figure 6 is a fragmentary cross-sectional view taken substantially along the line 6—6 of Figure 2;

Figure 7 is a cross-sectional view taken substantially along the line 7—7 of Figure 2;

Figure 8 is an enlarged elevational cross-sectional view through the forward portion of the instrument;

Figure 9:
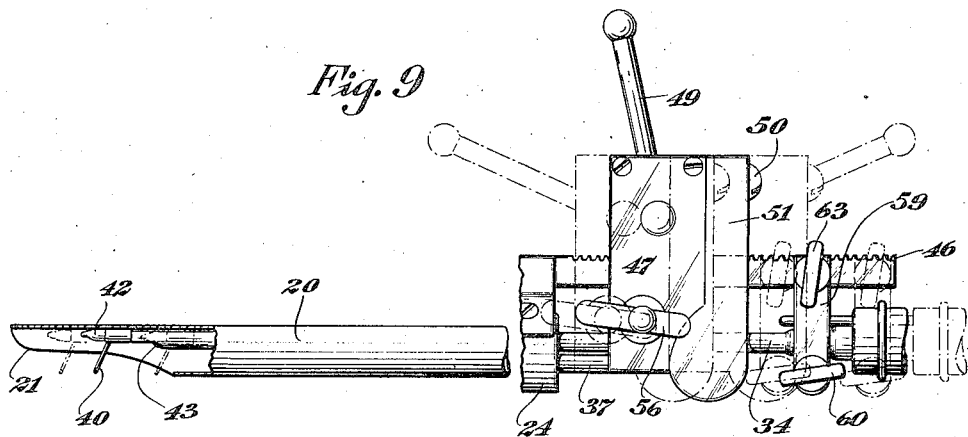
Figure 9 is a side view of the instrument, with portions broken away and other portions in section showing the manner of operation under one set of adjusted conditions.

The endoscopic tube 20 is provided at its forward end with the lateral opening or fenestra 21, and terminates at its rear end in the conventional collar 22 and the rearwardly opening attachment sleeve or neck 23. In the instrument chosen for purposes of illustration, the tube 20 is composed entirely of insulating material.

The assembly which is adapted to fit, removably, into the neck 23, consists of the main supporting element 24, provided with the slightly tapered attachment plug 25, together with the various elements and parts carried by the member 24. An attachment fork 26 is preferably provided for the purpose of engaging with the attachment element 27 which is provided on the neck 23 for the purpose of holding the parts in proper intimate relationship when the device is to be used.

Projecting forwardly from the plug 25 are the two opposite irrigation tubes 28 and 29, and the relatively short guide tube 30. The tubes 28 and 29 are of a length sufficient to extend almost to the fenestra 21, and near their forward ends they are associated and bound together with a supporting ring 31, as shown most clearly in Figure 4.

The tubes 28 and 29 are connected by suitable bores with the petcocks 32 and 33, respectively. The tube 30 is the forward continuation of a bore extending entirely through the plug 25 and the element 24, being adapted to accommodate the body of a telescope 34 in snug yet slidable relationship. Opposite the bore which accommodates the telescope there is a bore extending entirely through the plug 25 and the element 24 for accommodating an electrode rod in snug yet slidable relationship. The electrode rod is preferably composed of an elongated conductive element 35 arranged within a covering 36 of insulating material; the latter being in turn ensheathed by the metallic tube 37. At its forward end the element 35 merges with two forwardly divergent arms 38 and 39, ensheathed in suitable fine insulation; these arms terminating at their forward ends in the substantially transverse uninsulated operative loop 40.

The telescope 34 is preferably of the character shown and described in United States Letters Patent No. 1,680,491, terminating at its forward end in the attenuated projection 41, which carries the illuminating lamp 42, and in the eccentrically positioned objective lens 43. At the rear end, the telescope is provided with the customary eyepiece 44, and the usual contact bands 45 to which electrical connections may be made for operating the lamp 42.

The forward portions of the telescope 34 and of the electrode rod are accommodated within the confines of the band or ring 31, as shown in Figure 4. The arrangement is such that the forward operative end of the telescope positions itself between the arms 38 and 39 of the electrode, as shown most clearly in Figures 5, 8, 11, and 12.

In the conventional type of instrument, the telescope is fixed in position, and the electrode rod is longitudinally movable to advance and retract the operative loop 40 for the purpose, for example, of resecting a channel from the wall of an interior body cavity or the like. In accordance with my present invention, however, the parts are so associated and so mounted that the telescope may, if desired, be released from its fixed relationship to the tube 20, and may be locked into association with the electrode rod, so as to be movable therewith.

Figure 10:
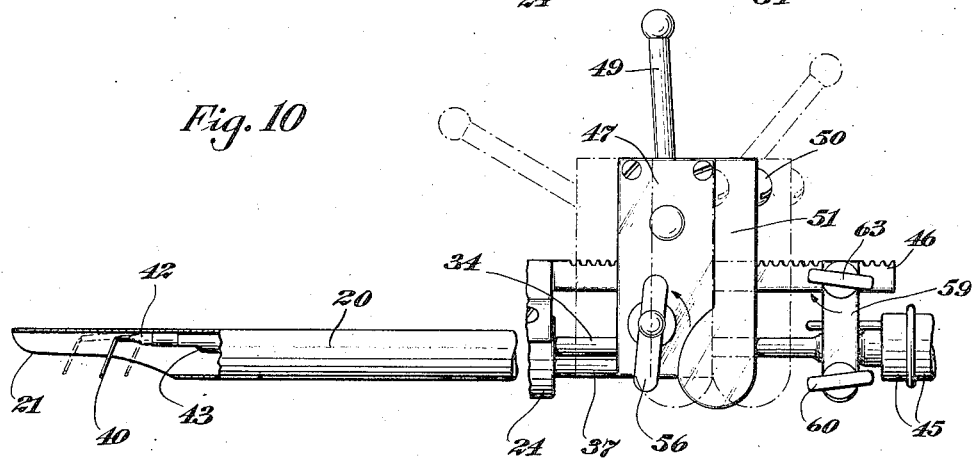
Figure 10 is a view similar to Figure 9 showing the mode of operation under the alternative set of conditions.

The construction I have herein illustrated, by way of example, consists of a rearwardly extending fixed rack 46, carried by the element 24, and a housing 47 slidably mounted upon the rack 46 and carrying the control pinion 48 which meshes with the rack 46. The pinion 48 is preferably provided with the control handle 49 which may be swung forwardly or rearwardly, as indicated in Figures 9 and 10, for the purpose of advancing or retracting the housing 47 along the rack 46.

Attached to the housing 47, as, for example, by means of the screw 50, is the auxiliary insulated housing 51 within which the rear end of the electrode rod is anchored, and from which the electric terminal 52 projects for the purpose of establishing a suitable electrical connection from an outside source of current to the electrode loop 40. A preferred arrangement is illustrated in Figure 3. The lower portion of the housing 47 has a bore through which the electrode rod 37 extends; and a setscrew 53 is adapted to clamp against the rear portion of the rod to hold it in proper position. The rear end of the insulation 36 extends into a small recess 54 in the auxiliary housing 51; and the rear end of the conductive member 35 is adapted to project into a recess within which it establishes contact with the conductive core of the binding post 52. The external connection is usually established by means of a connector 55 which is adapted to be inserted endwise into the terminal 52.

In the housing 47, immediately above the bore through which the electrode rod extends, I provide a second bore through which the telescope is adapted to extend. The latter bore is continued through the auxiliary housing 51. The lower portion of the housing 47, through which these bores extend, is split, as shown most clearly in Figure 6, whereby the manipulation of a clamping nut 56 may selectively clamp or release the telescope into or out of association with the housing 47. The nut 56 engages with a stud 57 mounted in the housing 47 and provided at its end with the auxiliary locking nut 58.

Engaging the telescope, near its rear end, is the clamping bracket 59 provided with a split edge engaging around the telescope and adapted to be clamped to the telescope by means of a clamping nut 60. This clamp does not fulfill any specific function in connection with my present invention. The element 59 is also provided with the opening 61 into which the forwardly projecting pin 62 is adapted to extend, thereby permitting the telescope to be adjusted rotationally by slight amounts.

At its upper end, the element 59 is provided with a channel slidably engaging around the rack 46, and a clamping nut 63 is adapted, upon tightening or loosening, to lock the bracket 59 to the rack 46, or to release it therefrom.

Assuming that the instrument is to be used in the conventional manner, with the telescope fixed in locked relationship to the tube 20, the clamping nut 63 is tightened, and the clamping nut 56 is loosened. The nut 63 locks the telescope to the rack 46, and thus to the tube 20. The release of the nut 56 permits the housings 47 and 51 to slide forwardly and rearwardly with respect to the telescope. With the parts in this relation, the telescope remains fixed, as indicated in Figure 10, and rotations of the control handle 49 advance and retract the electrode 40 in the manner indicated by the dot-and-dash positions of Figure 10. Upon looking through the telescope, the electrode may be seen to recede from the observer when it is advanced, and it may be observed approaching the observer as it is retracted. This forward and rearward movement of the electrode, relative to the tube and the telescope, is not in the least impeded by the telescope because of the arrangement of the divergent arms 38 and 39.

Figure 11:
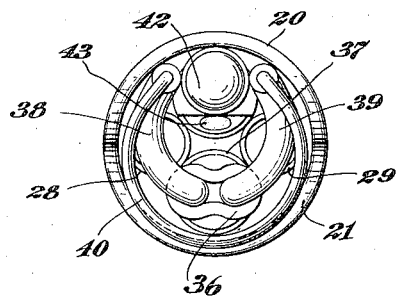
Figure 11 is an end view taken substantially along the line 11—11 of Figure 8.
Figure 12:
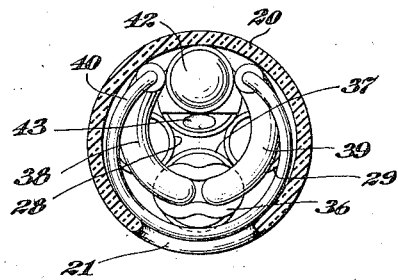
Figure 12 is a cross-sectional view taken substantially along the line 12—12 of Figure 8, with the electrode in retracted position.

Preferably, though not necessarily, the instrument is adapted to be used in a manner whereby the electrode 40 travels from substantially the full-line position of Figure 8 to the dot-and-dash position of this figure; and the arms 38 and 39 are yieldable and are arched in a manner whereby they bear against the rear wall of the tube 20 for the purpose of forcing the electrode loop 40 outwardly by a slight extent. As this loop completes its retractive movement, the rear curved edge of the fenestra guides the tube into the confines of the tube, as indicated in Figures 8, 11, and 12, so that a shearing relationship is established between the loop 40 and the rear edge of the fenestra at the completion of the movement of the loop.

Under certain circumstances, it is sometimes desirable to keep the loop constantly under close and predetermined observation, instead of permitting it to recede from or approach the objective of the telescope. To accomplish this object, it is merely necessary for the user of the present instrument to release the clamp 63, and to tighten the clamp 56. A release of the clamp 63 releases the telescope from locked relationship with the tube 20, and a clamping of the nut 56 locks the telescope into association with the housing 47, and hence into association with the electrode rod. Under these conditions, a movement of the control handle 49 results in advancing and retracting the parts, as indicated in Figure 9. It will be noted that the entire telescope, and with it the clamping element 59, advances and retracts in unison with the electrode rod. This is indicated by the full-line and the dot-and-dash line positions indicated in Figure 9. Accordingly, if the telescope is initially adjusted into predetermined desired relationship with the electrode loop, the longitudinal movements of the electrode loop will be accompanied by simultaneous movements of the telescope, whereby the loop is constantly maintained in a predetermined optical relationship to the objective of the telescope.

It will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention, and illustrated its use, what I claim as new and desire to secure by Letters Patent is—

1. In an instrument of the character described, an endoscopic tube, an electrode rod and a telescope mounted for longitudinal movement in said tube, said rod having an operative forward end and said telescope commanding a view of said end, and means for longitudinally reciprocating said rod and telescope in unison.

2. In an instrument of the character described, an endoscopic tube, an electrode rod and a telescope mounted for longitudinal movement in said tube, said rod having an operative forward end and said telescope commanding a view of said end, means for longitudinally reciprocating said rod, and means for selectively locking said telescope to said tube or to said rod.

3. In an instrument of the character described, an endoscopic tube, an electrode rod and a telescope mounted for longitudinal movement in said tube, said rod having an operative forward end and said telescope commanding a view of said end, and means for longitudinally reciprocating said rod and telescope in unison; said means comprising a rack and pinion arrangement, one element of which is associated with said tube and the other of which is associated with said rod and telescope.

4. In an instrument of the character described, an endoscopic tube, an electrode rod and a telescope mounted for longitudinal movement in said tube, said rod having an operative forward end and said telescope commanding a view of said end, a rack and pinion arrangement for longitudinally reciprocating said rod, one element of said arrangement being carried by said tube and the other being associated with said rod, and means for selectively locking said telescope to said tube or to said rod.

5. In an instrument of the character described, an endoscopic tube, an electrode rod and a telescope mounted for longitudinal movement in said tube, said rod having an operative forward end and said telescope commanding a view of said end, and means for longitudinally reciprocating said rod and telescope in unison; said means comprising a rack carried by said tube, and a control pinion meshing with said rack and movably associated with said rod and telescope.

6. In an instrument of the character described, an endoscopic tube, an electrode rod and a telescope mounted for longitudinal movement in said tube, said rod having an operative forward end and said telescope commanding a view of said end, a rack carried by said tube, a control pinion meshing with said rack and movably associated with said rod so that rotation of the pinion will longitudinally reciprocate said rod, and means for selectively locking said telescope to said tube or to said rod.

7. In an instrument of the character described, an endoscopic tube, an electrode rod and a telescope mounted for longitudinal movement in said tube, said rod having an operative forward end and said telescope commanding a view of said end, a rack carried by said tube, a control pinion meshing with said rack and movably associated with said rod so that rotation of the pinion will longitudinally reciprocate said rod, and means for selectively locking said telescope to said tube or to said rod; said means comprising a clamp carried by said telescope and releasably engageable with said rack, and a second clamp carried by said rod and releasably engageable with said telescope.

8. In an instrument of the character described, an endoscopic tube, an electrode rod and a telescope mounted for longitudinal movement in said tube, said rod having an operative forward end and said telescope commanding a view of said end, means for longitudinally reciprocating said rod, and means for selectively locking said telescope to said tube or to said rod, said last-named means comprising a clamp carried by said telescope and releasably engageable with said tube, and a second clamp carried by said rod and releasably engageable with said telescope.

FREDERICK CHARLES WAPPLER.